UNITED STATES PATENT OFFICE.

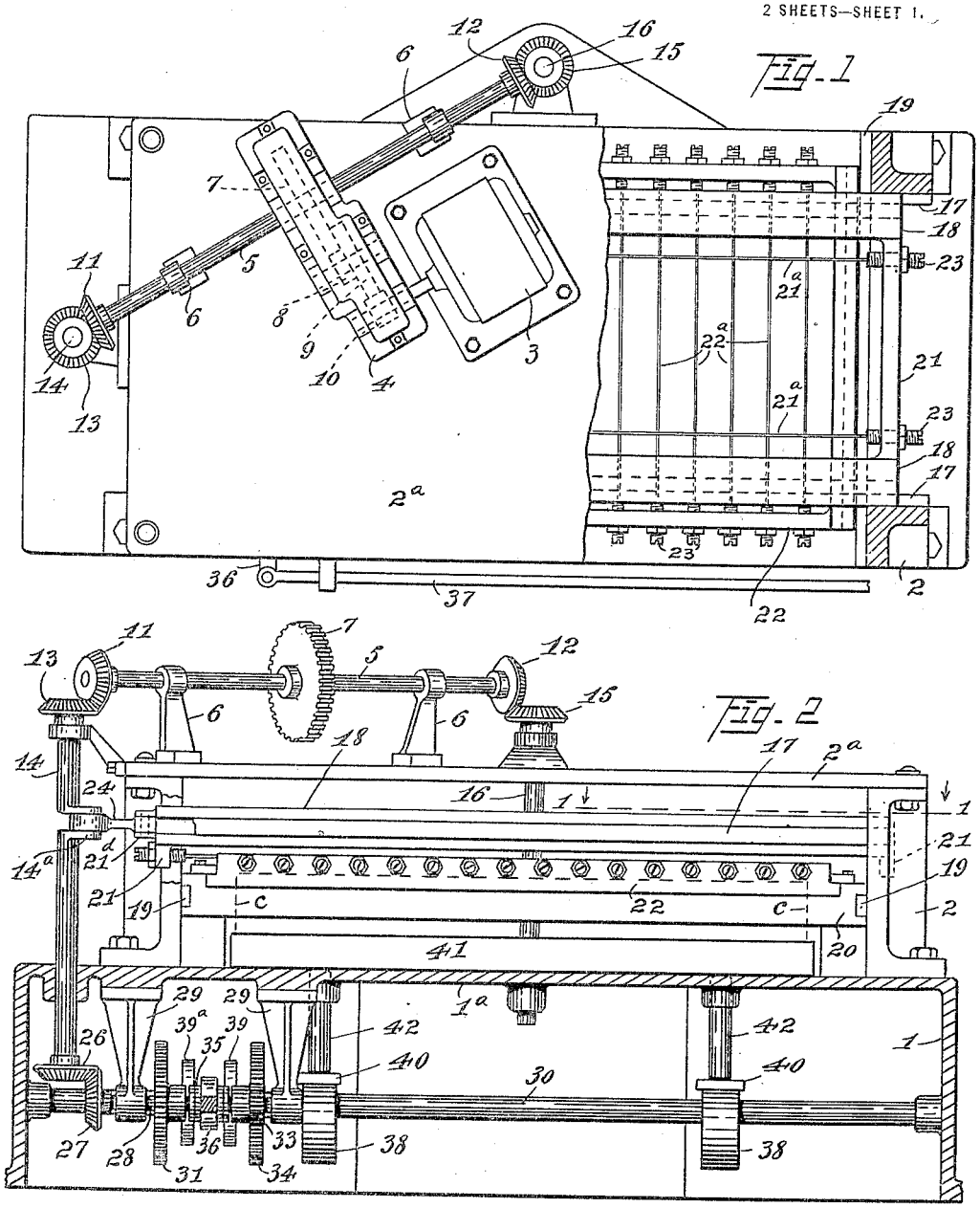

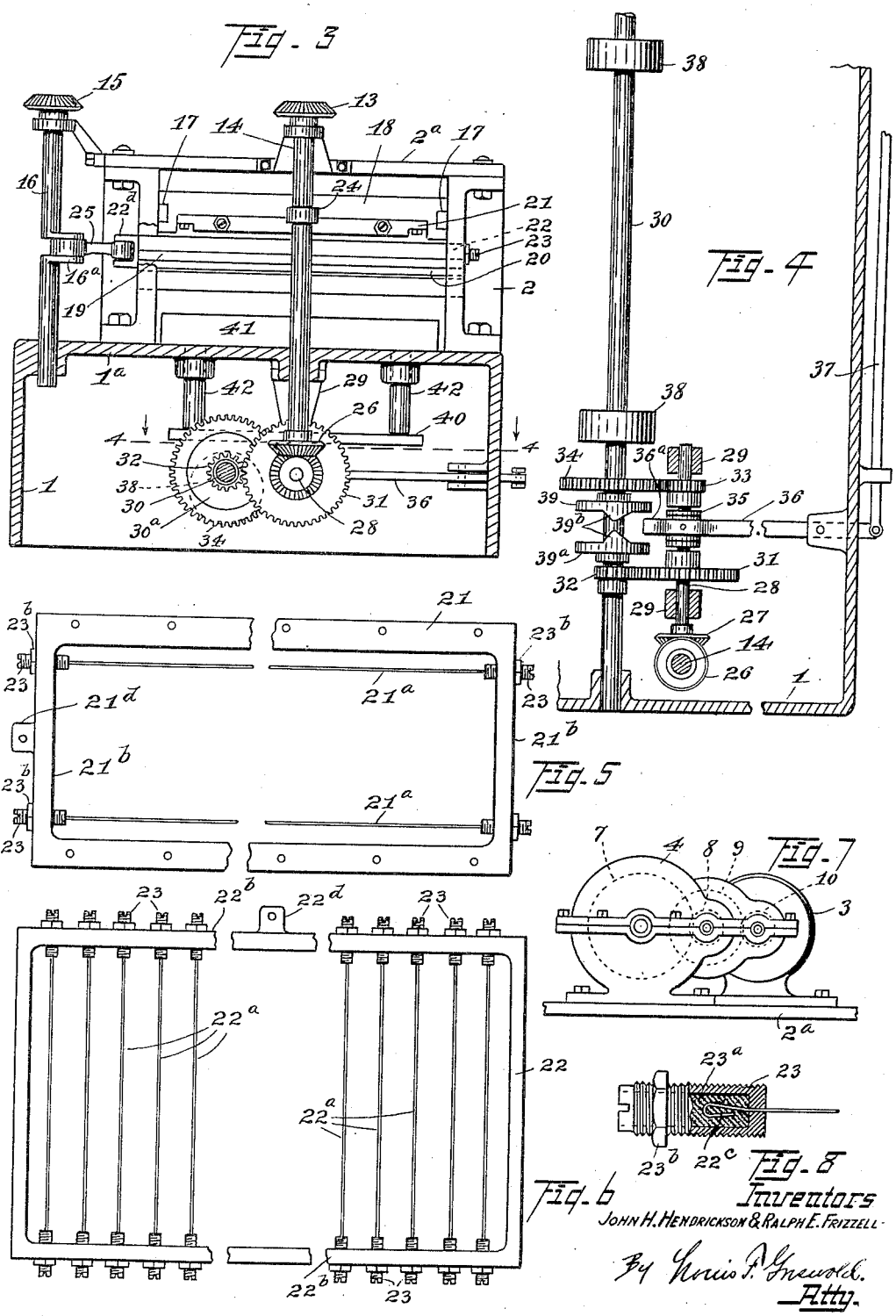

JOHN H. HENDRICKSON AND RALPH E. FRIZZELL, OF CLEVELAND, OHIO; SAID FRIZZELL ASSIGNOR TO SAID HENDRICKSON.

ICE-CREAM-CUTTING MACHINE.

1,346,405.  Specification of Letters Patent.  Patented July 13, 1920.

Application filed July 14, 1919. Serial No. 310,586.

*To all whom it may concern:*

Be it known that we, JOHN H. HENDRICKSON and RALPH E. FRIZZELL, citizens of the United States, residing at Cleveland, in the county of Cuyahoga and State of Ohio, have invented certain new and useful Improvements in Ice-Cream-Cutting Machines, of which the following is a specification.

This invention relates to mechanical means for cutting ice cream and the like. In most ice cream factories, it is the present day practice to freeze the product in rectangular forms of large dimensions, that is to say, of bulk dimensions equal to a number of quarts. The bulk, thus formed, is then cut into quart, pint, and half-pint sections or briquets for delivery to the trade. Heretofore the customary practice has been to cut the bulk by means of knives which are usually operated by hand. This means is more or less inefficient, owing to the ice cream being frozen very hard, and therefore not allowing necessary displacement except by the application of excessive pressure on the knife, which makes it very difficult to obtain an even, smooth cut, and is also extremely wearisome to the operator.

The primary object of the present invention is to provide a power machine that will expeditiously and efficiently cut bulk ice cream into rectangular briquets of any desired size, the mechanism coöperating so that longitudinal and transverse cuts are made simultaneously.

Further objects of the invention are, the provision of a machine for the purpose set forth, that is durable and reliable; that can be readily arranged so as to form briquets of various predetermined dimensions; and that can be economically maintained in operative condition.

With these objects in view, the invention consists in the construction, combination and arrangement of parts as hereinafter described and pointed out definitely in the claims, reference being had to the accompanying drawings which are made part of the specification, similar reference characters being employed to designate corresponding parts.

In the said drawings Figure 1 is a plan view of the improved machine, partially in section on line 1—1 of Fig. 2.

Fig. 2 is a side elevation showing the bed member in section, and the gear case and motor removed.

Fig. 3 is an end view, with the said bed member in section, and with the driving mechanism removed.

Fig. 4 is a fragmentary section on line 4—4, Fig. 3.

Fig. 5 is a plan view of a longitudinal cutting frame provided, and Fig. 6 is a similar view of a transverse cutting frame.

Fig. 7 is an elevation of the gear case and motor.

Fig. 8 is a view of one of the wire holders, partially in section.

In the present embodiment 1 represents a bed member which provides a base and a housing for the lower operating mechanism, as hereinafter described. Said member 1 also provides a support for the upper housing 2 which accommodates the cutting members and the driving mechanism.

The housing 2 is provided with a cover $2^a$ which supports the motor 3 and the gear case 4. A main driving shaft 5 is mounted in bearing brackets 6 supported by the member $2^a$. A spur gear 7 is carried on the shaft 5, said gear being driven from the motor 3 by a chain of gears 8, 9 and 10. Bevel gears 11 and 12 are also carried by the shaft 5. The gear 11 is in mesh with a companion gear 13 on a vertical crank-shaft 14, and the gear 12 is in mesh with a companion gear 15 on a vertical crank-shaft 16. The crank-shaft 14 operates the longitudinal cutting member and the crank-shaft 16 operates the transverse cutting member.

Longitudinal guides 17 are provided in connection with the upper housing, and a cross-head member 18 is adapted to slide longitudinally on said guides. Transverse guides 19 are also provided in connection with the upper housing, the said guides 19 providing ways on which a cross-head 20 is adapted to slide transversely. Connected with the cross-head 18 is a rectangular frame 21, and connected with the cross-head 20 is a rectangular frame 22. The frames 21 and 22 carry the cutting members, and are adapted to removal and replacement for cutting briquets of various differing dimensions.

The frame 21 is provided with longitudinally extending, transversely spaced cutting wires $21^a$, and the frame 22 carries transverse cutting wires $22^a$ longitudinally spaced. The cutting wires in the frames are firmly connected with, and made taut in said frames. A preferable means for connecting the wires with the frames, comprises studs 23 having the wires firmly attached thereto by embedding the terminals 22$^c$ in lead or "Babbitt" metal 23$^a$, as shown in Fig. 8. The studs 23 are threaded, and are adapted to extend through apertures in the end rails 21$^b$ of the frame 21, and through similar apertures in the side rails 22$^b$ of the frame 22, nuts 23$^b$ being threaded on the studs, said nuts bearing on the outer faces of the respective rails, providing means for drawing the wires taut.

The frame 21 is provided with a bifurcated boss 21$^d$ which is connected by a link 24 with a crank 14$^a$ on the crank-shaft 14, and a similar boss 22$^d$ on the frame 22 provides like connection, through the medium of the link 25 with the crank-shaft 16.

It will readily be seen that when the shaft 5 is driven a reciprocating movement will be imparted to both the frames 21 and 22 simultaneously, through the co-action of the bevel gears 11 and 12 with the gears 13 and 15 respectively, said gears 13 and 15 being on the respective crank-shafts 14 and 16, and said crank-shafts being connected with the frames 21 and 22 by the links 24 and 25. The frames 21 and 22 are caused to reciprocate at right angles to each other, simultaneously, owing to the particular relative location of the vertical crank-shafts 14 and 16, said shafts being driven by the same diagonal shaft 5.

A bevel gear 26 is provided on the lower end of the crank-shaft 14, said gear 26 being in mesh with a companion gear 27 which is carried on a jack-shaft 28 mounted in bearing brackets 29 which are located within the base member 1, depending from the top 1$^a$ thereof. A shaft 30 is mounted in the base member 1, parallel with, and in the same horizontal plane as the jack-shaft 28, and a spur gear 31 is revolubly mounted on the shaft 28 and adapted to mesh with a pinion 32 carried by the shaft 30, and a revoluble pinion 33 on the shaft 28 is in mesh with a gear 34 carried on the shaft 30. A clutch 35 is interposed, on the shaft 28, between the gear 31 and the pinion 33, said clutch being operated longitudinally on said shaft 28, through the medium of the lever 36 being actuated by the rod 37. The function of the clutch 35 is to connect, or disconnect the gear 31, or the pinion 33 with the shaft 28, and thereby change the speed of the shaft 30, or throw said shaft 30 out of operation when the clutch is in a neutral position as shown in Fig. 4.

The shaft 30 carries vertically operating cam members 38, and two oppositely disposed horizontally acting cams 39 and 39$^a$. The cams 38 when revolved with the shaft 30, act on the plates 40 to raise and lower a platform 41 through the medium of the vertically movable rods 42 on which said platform rests.

The bulk ice cream, or like product, to be operated upon, is placed on the platform 41, between said platform and the plane of the cross wires 22$^a$ in substantially the position indicated by the broken lines $c$, Fig. 2. The clutch 35 is thrown into engagement with either the gear 31 or the pinion 33, according to the speed desired. The motor is then energized and the mechanism put into action, thereby bringing about the simultaneous raising of the platform 41, and the reciprocation of the cutter frames 21 and 22. The bulk product is carried upward on the platform 41 thereby encountering the cross wires in the frames 21 and 22. The reciprocating movement of the said frames, at right angles, one above the other, imparts a sawing action to the wires 21$^a$ and 22$^a$, that cuts the bulk into uniform briquets of predetermined desired dimensions.

The cam wheels 39 and 39$^a$ are so arranged, in relation to the eccentricity of the cams 38, that when said cams 38 have raised the platform 41 to its upward limit, one of the lugs 39$^b$ will encounter the extension 36$^a$ of the lever 36, thereby shifting the clutch to a neutral position, releasing the spur gears on the jack-shaft, and allowing the platform 41, and the briquets carried thereon, to drop by gravity to a normal position. The briquets are then removed from the platform and the machine recharged for another operation.

While we have shown a specific construction in the present embodiment, it will be understood that various changes in details may be resorted to without departing from the spirit and scope of the invention.

What we claim and desire to secure by Letters Patent is.

1. In a machine for cutting bulk ice cream into sections, the combination of a housing; frames adapted to reciprocate in said housing; a series of cutter wires carried in each of said frames; crank-shafts connected with said frames; power mechanism for driving said crank-shafts; a movable table for supporting the bulk to be operated on; cam mechanism for moving said supporting table, thereby carrying the bulk into engagement with the cutter members; said cam mechanism co-acting with the driving mechanism through geared connection with one of the crank-shafts.

2. In a machine of the character set forth, the combination of a housing, two cutter frames adapted to reciprocate in said housing at right angles to each other and in parallel horizontal planes, cutting wires spaced across said frames and drawn taut in the direction of reciprocation of the respective frames, a vertical crank-shaft mounted on one side of said housing, link connection between said crank-shaft and one of the reciprocating frames, a second vertical crank-shaft mounted on one end of the housing, link connection between the last named vertical shaft and the other reciprocating frame, mechanism for driving said crank-shafts simultaneously, a carrier member in the housing, and means for raising and lowering said carrier, said means co-acting with the driving mechanism through geared connection with one of the crank-shafts, and operating in timed relation to the movements of the cutter frames.

3. In a machine of the character set forth, the combination of a housing, a cutter member adapted to reciprocate longitudinally in said housing, a second cutter member adapted to reciprocate transversely in said housing, said cutter members operating in horizontal planes one above the other, vertical crank-shafts connected with said cutter members, power mechanism for driving said crank-shafts, a carrier for the matter to be operated upon, arranged in said housing below the reciprocating cutter members and adapted to vertical movement, a cam shaft mounted in a horizontal plane below the carrier, vertically acting cams on said cam shaft, vertical connection between said cams and the carrier, and means for driving said cam shaft, said means co-acting with the driving mechanism through the medium of gear connection with one of the crank shafts, whereby the carrier is operated in timed relation to the movements of the reciprocating members.

4. In a machine for the purpose set forth, the combination of a housing, a cutter member adapted to reciprocate longitudinally in said housing, a second cutter member adapted to reciprocate transversely in said housing, said cutter members operating in horizontal planes one above the other, vertical crank-shafts connected with said cutter members, power mechanism for driving said crank-shafts, a carrier for the matter to be operated upon, arranged in said housing below the reciprocating cutter members, and adapted to vertical movement, a cam shaft mounted in a horizontal plane below the carrier, vertically acting cams on said cam shaft, vertical connection between said cams and the carrier, a jack-shaft mounted parallel with the cam shaft, gear connection between said jack-shaft and one of the vertical crank-shafts, and changeable speed gear connection between the jack-shaft and the cam shaft.

5. In a machine for cutting bulk ice cream into rectangular sections, the combination of a housing, a series of longitudinal cutter wires carried in a holder adapted to reciprocate longitudinally in said housing, a series of transverse cutter wires carried in a holder adapted to reciprocate transversely in said housing, crank-shafts connected with said holders, power mechanism for driving said crank-shafts, a vertically movable table for supporting the bulk to be operated upon, and means for raising and lowering the supporting table, thereby carrying the bulk into engagement with the cutter members, said means connected to and co-acting with the crank-shafts in timed relation to the operation of the reciprocating cutter members.

6. In a machine for cutting bulk ice cream into rectangular sections, the combination of a housing, a series of longitudinal cutter wires carried in a holder adapted to reciprocate longitudinally in said housing, a series of transverse cutter wires carried in a holder adapted to reciprocate transversely in said housing, crank-shafts connected with said holders, power mechanism for driving said crank-shafts, a vertically movable table for supporting the bulk to be operated upon, a cam shaft mounted in a horizontal plane below the movable table, vertically acting cams on said cam shaft, vertical connection between said cams and the table, a jack-shaft mounted parallel with the cam shaft, gear connection between said jack-shaft and one of the crank-shafts, changeable gear connection between the jack-shaft and the cam shaft, said connection including gears of different diameters normally revoluble on the jack-shaft and in mesh with gears carried by the cam shaft, clutch means for engagement of the revoluble gears and the jack-shaft, and means on the cam shaft for automatically shifting said clutch means to a neutral position.

In testimony whereof we affix our signatures.

JOHN H. HENDRICKSON.
RALPH E. FRIZZELL.